United States Patent
Van Laanen

(10) Patent No.: US 8,502,649 B2
(45) Date of Patent: *Aug. 6, 2013

(54) SYSTEMS AND METHODS FOR CONVEYING INFORMATION USING A CONTROL SIGNAL REFERENCED TO ALTERNATING CURRENT (AC) POWER

(75) Inventor: Peter Van Laanen, Boulder, CO (US)

(73) Assignee: Albeo Technologies, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/598,195

(22) Filed: Aug. 29, 2012

(65) Prior Publication Data
US 2012/0319622 A1    Dec. 20, 2012

Related U.S. Application Data

(63) Continuation of application No. 12/238,705, filed on Sep. 26, 2008, now Pat. No. 8,284,035.

(51) Int. Cl.
*G05B 11/01* (2006.01)
(52) U.S. Cl.
USPC .......... 340/12.32; 340/12.23; 340/12.35; 340/12.39; 340/3.1; 340/3.21; 340/3.54; 340/10.34; 340/660; 340/661; 340/663; 340/664
(58) Field of Classification Search
USPC .......... 340/12.32, 12.23, 12.35, 12.39, 3.1, 340/3.21, 3.54, 10.34, 660, 661, 663, 664
See application file for complete search history.

(56) References Cited

U.S. PATENT DOCUMENTS

| | | | |
|---|---|---|---|
| 6,784,790 B1 | 8/2004 | Lester | |
| 7,843,145 B2 | 11/2010 | McKenzie et al. | |
| 8,072,323 B2 | 12/2011 | Kodama et al. | |
| 8,130,085 B2 * | 3/2012 | Noh | 340/12.32 |
| 2006/0077046 A1 * | 4/2006 | Endo | 340/310.11 |

OTHER PUBLICATIONS

Notice of Allowance issued in related U.S. Appl. No. 12/238,705, dated Jun. 29, 2012, 9 pages.

* cited by examiner

*Primary Examiner* — Tai T Nguyen
(74) *Attorney, Agent, or Firm* — Lathrop & Gage LLP

(57) ABSTRACT

Systems and methods convey information from a controller to at least one slave unit using a single wire referenced to an alternating current (AC) power supply. A control signal has a high voltage and a low voltage. The high voltage is greater than a voltage midpoint of the AC power supply and the low voltage is less than the voltage midpoint. The control signal is conveyed through the single wire to each of the at least one slave unit. At each slave unit, a comparison voltage, representative of the voltage midpoint, is generated by dividing substantially midway the potentials between the power lines of the AC power supply and the control signal is compared to the comparison voltage to determine low and high states of the control signal; the low and high states represent the information.

24 Claims, 6 Drawing Sheets

US 8,502,649 B2

SYSTEMS AND METHODS FOR CONVEYING INFORMATION USING A CONTROL SIGNAL REFERENCED TO ALTERNATING CURRENT (AC) POWER

CROSS REFERENCE TO RELATED APPLICATIONS

This application is a continuation application of, and claims priority to, commonly-owned and U.S. patent application Ser. No. 12/238,705, filed Sep. 26, 2008, now U.S. Pat. No. 8,284,035, which is incorporated by reference in its entirety.

BACKGROUND

Control signals typically have an associated ground return or reference signal that provides a reference against which the signal is compared.

SUMMARY OF THE INVENTION

In an embodiment, a method conveys information from a controller to at least one slave unit using a single wire referenced to an alternating current (AC) power supply. A control signal is generated within the controller based upon the information; the control signal has a high voltage and a low voltage. The high voltage is greater than a voltage midpoint of the AC power supply and the low voltage is less than the voltage midpoint. The voltage midpoint is substantially midway between potentials of power lines of the AC power supply. The control signal is conveyed through the single wire to each of the at least one slave unit. At each of the at least one slave unit, a comparison voltage, representative of the voltage midpoint, is generated by dividing substantially midway the potentials between the power lines of the AC power supply. At each of the at least one slave unit, the control signal is compared to the comparison voltage to determine low and high states of the control signal; the low and high states representing the information.

In another embodiment, a system conveys, through a single wire referenced to an alternating current (AC) power supply, information from a controller to at least one slave unit. The system includes a drive circuit within the controller for driving the single wire with a control signal based upon the information and having a low voltage and a high voltage. The low voltage is less than a voltage midpoint of the AC power supply and the high voltage is greater than the voltage midpoint. The voltage midpoint is substantially midway between potentials of power lines of the AC power supply. The system also includes a reference circuit, within each of the at least one slave unit, for generating a comparison voltage by dividing substantially midway the potentials of the power lines of the AC power supply. A compare circuit is included within each of the at least one slave unit for comparing the control signal received via the single wire to the comparison voltage to determine low and high states of the control signal; the low and high states representing the information.

In another embodiment, a lighting system includes an alternating current (AC) power supply, a controller connected to the AC power supply and at least one lighting unit, each lighting unit connected to the AC power supply. The controller has a drive circuit for driving a single wire with a pulse width modulation (PWM) signal based upon a desired lighting output level. The PWM signal has a high voltage and a low voltage, where the high voltage is greater than a voltage midpoint of the AC power supply, and the low voltage is lower than the voltage midpoint. The voltage midpoint is substantially midway between potentials of power lines of the AC power supply. The at least one lighting unit includes at least one light emitting device, a lighting control circuit for controlling light output of the at least one light emitting device, a reference circuit for generating a comparison voltage by dividing substantially midway the potentials of the power lines of the AC power supply, and a compare circuit for comparing the PWM signal, received via the single wire from the controller, to the comparison voltage to determine low and high states of the PWM signal. The low and high states are input to the lighting control circuit to control the light output of the at least one light emitting device based upon the desired lighting output level.

DETAILED DESCRIPTION OF THE DRAWINGS

Figure 1:
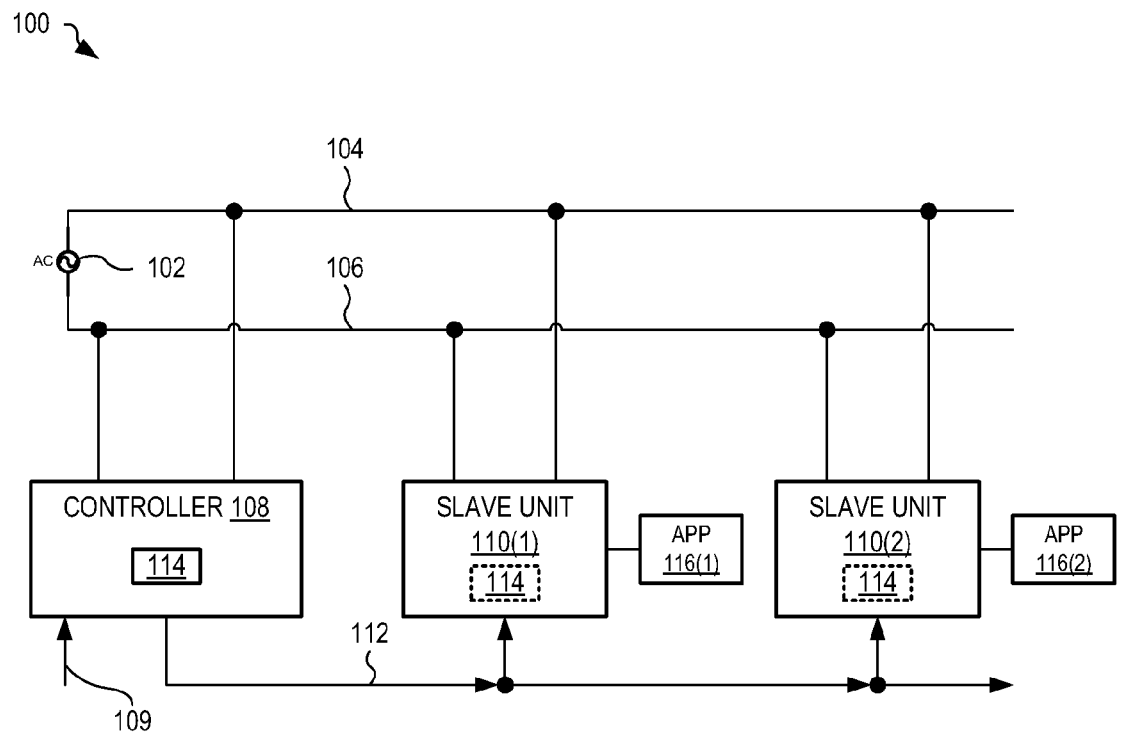
FIG. 1 is a block diagram showing one exemplary system for conveying level information using a control signal referenced to alternating current (AC) power, in an embodiment.

FIG. 1 is a block diagram showing one exemplary system 100 for conveying information 114 using a control signal 112 referenced to alternating current (AC) power 102. In particular, system 100 conveys information 114 from a controller 108 to one or more slave units 110 via a single wire control signal 112, where controller 108 and each slave unit 110 are connected to power lines 104 and 106 of alternating-current (AC) power 102. That is, power lines 104, 106 of the AC power source 102 are connected to controller 108 and each slave unit 110. Each slave unit 110 drives an application circuit 116 to be controlled from controller 108. Slave units 110 are for example lighting controllers powered (e.g., with 50-60 Hz AC 12-24 volt power) by AC power source 102, through power lines 104, 106, such that a lighting level output by application circuits 116 (e.g., LED lights) is remotely controlled from controller 108. In another example, slave units 110 represent fan controllers of a ventilation system, wherein the conveyed information 114 (e.g., level, on and off) determines an operating parameter of one or more application circuits 116 (e.g., determines speed of one or more ventilation fans). AC power source 102 may be selected based upon a particular application (e.g., lighting, ventilation); other voltages and frequencies may be provided by AC power source 102 without departing from the scope hereof. Control signal 112, generated by controller 108, connects to each slave unit (i.e., slave unit 110(1) and slave unit 110(2), in the example of FIG. 1) to convey information 114 (e.g., level, on and off) concurrently to each slave unit 110. More particularly, control signal 112 conveys information 114 encoded as a signal referenced to AC power source 102 to each slave unit 110 where it is decoded into a signal suitable for input to application circuit 116. That is, control signal 112 is a binary type signal referenced to AC power source 102.

Controller 108 generates control signal 112 based upon an external input 109 that may provide information 114 (e.g., a level range between 0% and 100%, and/or on and off) of desired operation of application circuit 116 by slave units 110. External input 109 may be from one of a dimmer switch, an on/off switch, a sensor, a timer, or other control device. Alternatively, or in combination therewith, controller 108 may include one or more other sources (e.g., sensors) that are used to determine information 114 conveyed to slave units 110.

Figure 2:
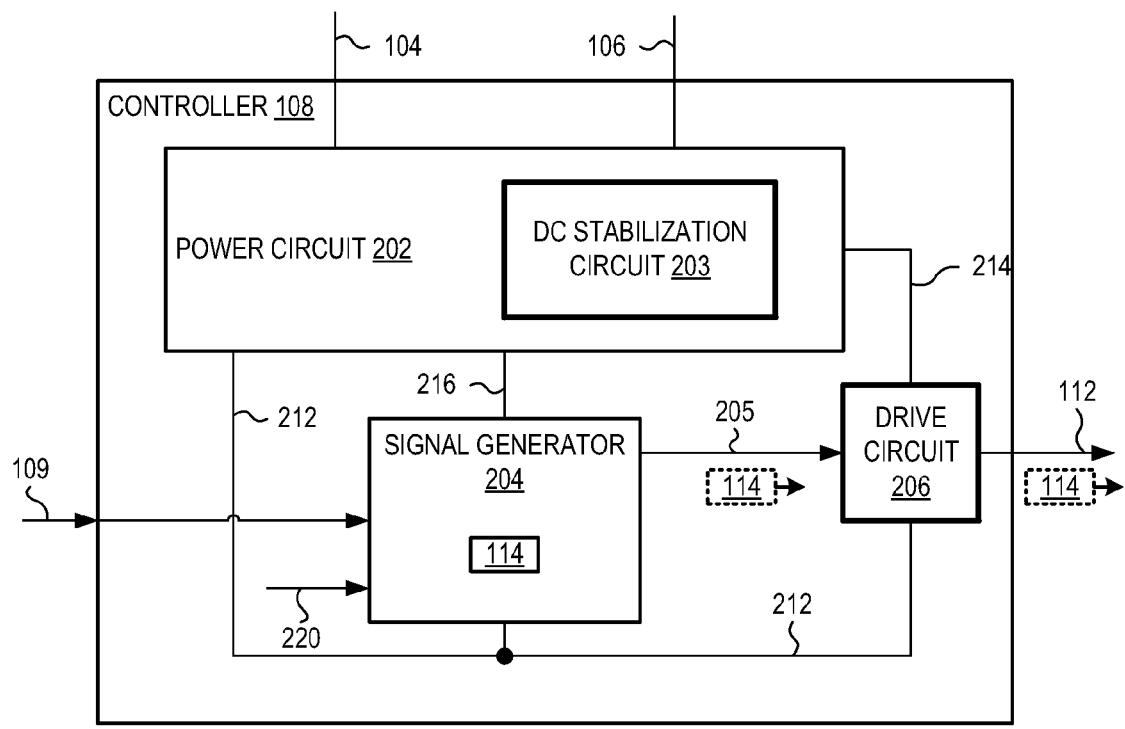
FIG. 2 is a block diagram illustrating exemplary components of the controller of FIG. 1.

FIG. 2 is a block diagram illustrating exemplary components of controller 108 of FIG. 1. Controller 108 is shown with a signal generator 204, a drive circuit 206, and a power circuit 202 that includes a DC stabilization circuit 203. Signal generator 204 receives external input 109 indicating information 114 (e.g., level, and/or on and off) to be conveyed to slave units 110. Information 114 may for example specify a level value (e.g., between 0% and 100%) and/or state values of on and off. Since toggling of control signal 112 is not required for conveyance of information 114, control signal may indicate on and off states directly. In one example of operation, when control signal 112 is high, slave units 110 turn outputs controlled by control signal 112 off; when control signal 112 is low, slave units 110 turn outputs controlled by control signal 112 on.

Power circuit 202 operates to convert power from AC power source 102 into DC power for signal generator 204 and drive circuit 206. In particular, power circuit 202 supplies logic power 216 and negative power 212 to signal generator 204, and supplies positive power 214 and negative power 212 to drive circuit 206.

Based upon input 109, and optionally input signal 220, signal generator 204 generates an internal signal 205 for input to drive circuit 206, which in turn generates control signal 112 based upon internal signal 205. In one embodiment, internal signal 205 is a pulse-width-modulated (PWM) signal where a mark-to-space ratio of the PWM signal is based upon information 114. In another embodiment, internal signal 205 is a digitally encoded (e.g., based upon a digital communication protocol) signal of information 114.

Optionally, signal generator 204 may have one or more additional input signals 220 (e.g., inputs from one or more local and/or remote sensors) that may be used to determine information 114. For example, signal generator 204 may operate to automatically adjust output levels of slave units 110, using control signal 112, based upon input signals 109 and 220 from one or more switches, sensors or other devices. Signal generator 204 may represent a small 8 bit microcontroller such as an Atmel ATtiny 13 AVR microcontroller, or other programmable or configurable device, that processes one or both of input signals 109 and 220 to determine information 114 and generate internal signal 205 based thereon. In an embodiment, where input signal 109 is based upon a voltage level representing a desired level, the microcontroller may first digitize that voltage and generate a pulse width modulated signal (e.g., internal signal 205) based upon the digitized value. As the input voltage of input signal 109 changes, the microcontroller continuously, or periodically, digitizes the input voltage and adjusts the mark-to-space ratio of the pulse width modulated signal. In another embodiment, input signal 109 is a serially encoded value that is decoded by the microcontroller and used to generate a PWM signal (e.g., internal signal 205) representative of the decoded value. Signal generator 204 may be formed to generate internal signal 205 based upon the format of one or both of input signals 109 and 220 without departing from the scope hereof.

Drive circuit 206 generates, based upon input from internal signal 205, control signal 112 that is driven to voltage levels of positive power 214 and negative power 212, and is thereby referenced to power lines 104, 106 of AC power source 102, since DC power produced by power circuit 202 is referenced to power lines 104, 106 of AC power source 102 by DC stabilization circuit 203. Internal signal 205 and control signal 112, when toggling, may operate at frequencies between 0 Hz and 10 KHz. depending upon the application. In one embodiment, when implemented as a PWM signal, internal signal 205 and control signal 112, when toggling, operate at a frequency between 100 Hz and 1 KHz. For example, where control signal 112 is used directly by slave units 110 to control a lighting application (LED lighting in particular), the toggling frequency of control signal 112 may be selected to avoid flicker in the generated light perceptible to the human eye, and at a low enough frequency to not require high levels of power. Alternatively, where slave units 110 communicate with application circuit 116 (see for example LED driver 818, FIG. 8), the toggling frequency of control signal 112 may be selected to match that application.

Figure 3:
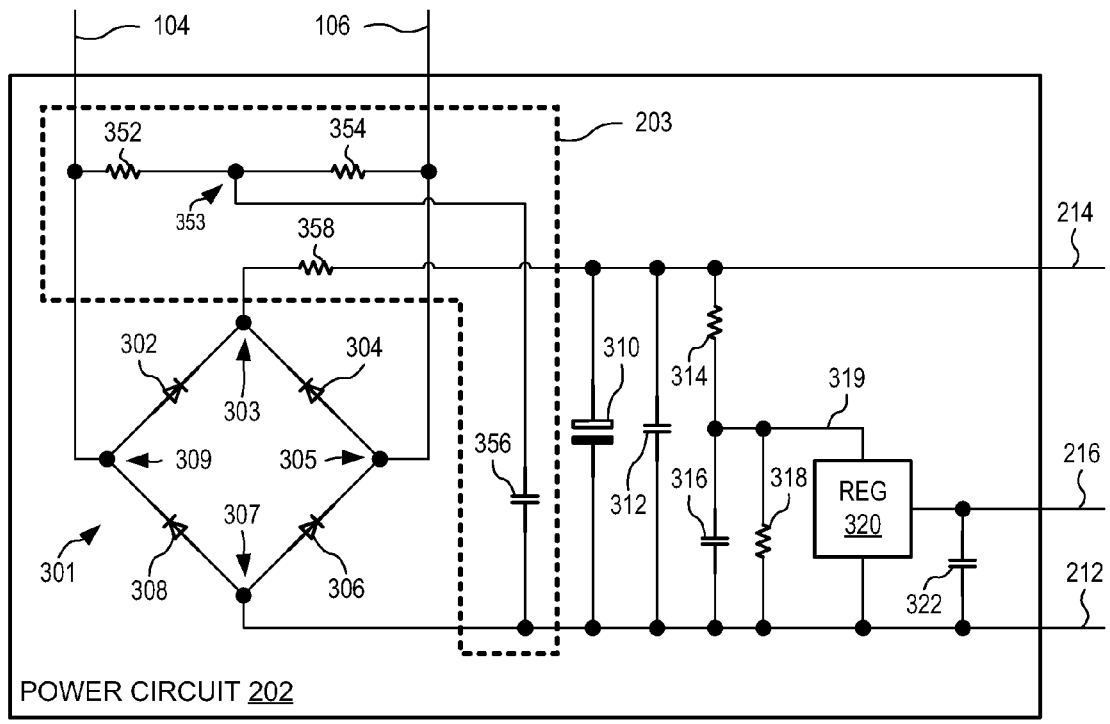
FIG. 3 is a schematic diagram illustrating the power circuit and the DC stabilization circuit of FIG. 2 in further detail.

In the following, exemplary component values are provided for operating with a 12 volt AC power source; other component values may be required to operate at other voltages. FIG. 3 is a schematic diagram illustrating power circuit 202 and DC stabilization circuit 203 of FIG. 2 in further detail. Four diodes 302, 304, 306 and 308 form a bridge rectifier 301, as shown. Diodes 302, 304, 306 and 308 may represent diodes of type ISS400. An AC junction 305 connects to power line 106 and an AC junction 309 connects to power line 104; bridge rectifier 301 thereby receives power from AC power source 102 via power lines 104 and 106. A negative junction 307 of bridge rectifier 301 provides a negative power 212 output of power circuit 202. A positive junction 303 of bridge rectifier 301 connects to a first end of a resistor 358 of DC stabilization circuit 203; the other end of resistor 358 forms a positive power 214 output of power circuit 202. In one example, resistor 358 has a value of about 1 ohm. One or more capacitors (shown as electrolytic capacitor 310 and capacitor 312) may connect between, and provide filtering of power output between, positive power 214 and negative power 212. In one example, electrolytic capacitor 310 represents two electrolytic capacitors, each with a value of about 100 μF and a rating of 50V, and capacitor 312 represents three capacitors each with a value of 10 μF.

A first end of a resistor 314 connects to positive power 214; the other end of resistor 314 connects to a power input 319 of a regulator 320. A ground of regulator 320 connects to negative power 212. A capacitor 316 and a resistor 318 connect in parallel between the input 319 of regulator 320 and negative power 212. Resistors 314 and 318 form a potential divider between positive power 214 and negative power 212, thereby providing a reduced (relative to the voltage between positive power 214 and negative power 212) voltage input 319 to regulator 320. An output of regulator 320 forms logic power 216 output of power circuit 202; a capacitor 322 connects between logic power 216 and negative power 212 to provide filtering of power provided by regulator 320 to logic power 216.

In one example, regulator 320 is an LM3480 100 mA, SOT-23, Quasi Low-Dropout Linear Voltage Regulator from National Semiconductor Corporation, resistors 314 and 318 each have a value of 1K ohms, capacitor 316 has a value of 1 μF, and capacitor 322 has a value of 1 μF; regulator 320 thereby produces logic power 216 of 3.3V as suitable for signal generator 204.

Within DC stabilization circuit 203, a first end of a resistor 352 connects to power line 104 and a first end of a resistor 354 connects to power line 106; the other end of resistor 352 connects to the other end of resistor 354, forming a reference point 353. Resistors 352 and 354 have substantially equal resistance values and form a potential divider across AC power source 102 such that a stabilization voltage of reference point 353 has a potential midway (i.e., half way) between power lines 104 and 106. A capacitor 356 connects between reference point 353 and negative power 212. In one example, resistors 352 and 354 each have a value of 10K ohms and capacitor 356 has a value of 10 μF such that sufficient stability of negative power 212 with reference to AC power source 102 is provided without drawing excessive current through resistors 352 and 354. Component values for resistors 352 and 354 and capacitor 356 are selected to have a time constant equal to, or preferably greater than, the maximum period of non-conduction of diodes 302, 304, 306 and 308 (e.g., at least half the cycle period of AC power source 102).

Resistor 358 has a low resistance value (e.g., one ohm) such that the active current flow period of diodes 302, 304, 306 and 308 is increased, thereby reducing the duration of zero current flow through diodes 302, 304, 306 and 308, since active current flow through diodes 302, 304, 306 and 308 maintains the relative position of positive power 214 and negative power 212 with respect to power lines 104 and 106. Capacitor 356, by maintaining a constant charge (voltage), further stabilizes negative power 212 (and hence positive power 214) with respect to power lines 104 and 106 during the reduced periods of zero current flow through diodes 302, 304, 306 and 308. DC output from similar power circuits without DC stabilization circuit 203 is unreferenced to their respective AC power lines; such DC referencing is not typically required when signals are referenced to a common ground signal (e.g., of the DC power supply). The relevance of DC stabilization circuit 203 becomes more obvious upon understanding operation of drive circuit 206, described below.

Figure 4:
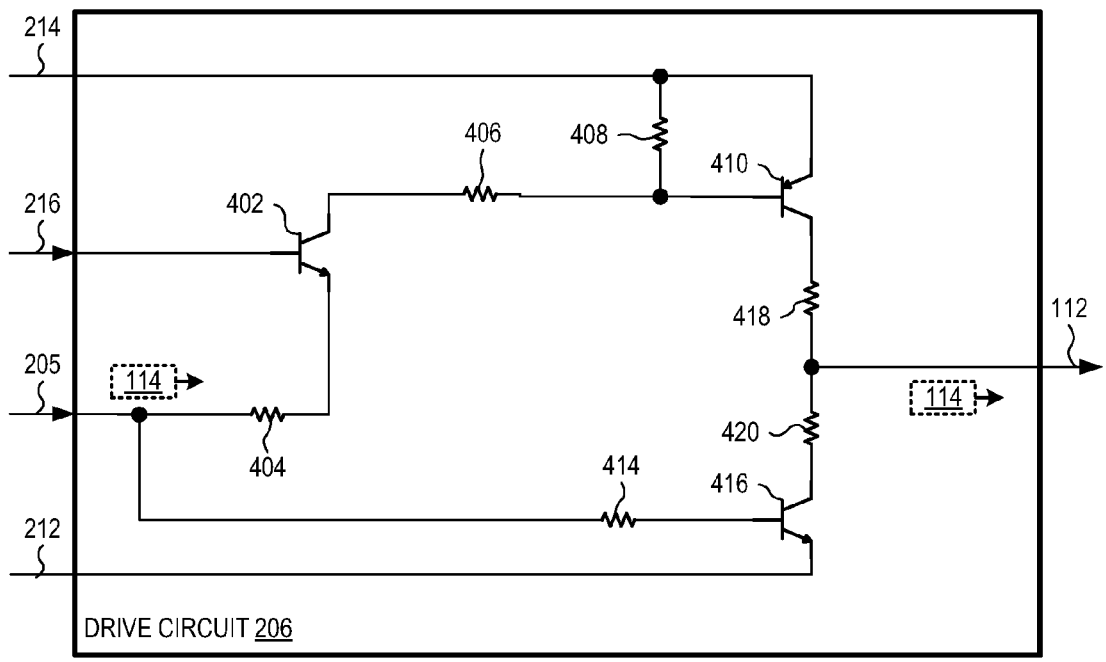
FIG. 4 is a schematic diagram illustrating exemplary components of the drive circuit of FIG. 2.

FIG. 4 is a schematic diagram illustrating exemplary components of drive circuit 206, FIG. 2. Drive circuit 206 receives DC power from power circuit 202, FIG. 3; in particular, drive circuit 206 connects to positive power 214, logic power 216 and negative power 212 of power circuit 202. Logic power 216 is connected to a base terminal of an NPN transistor 402. Internal signal 205 connects to a first end of a resistor 404; the other end of resistor 404 connects to an emitter terminal of transistor 402. A collector terminal of transistor 402 connects to a first end of a resistor 406; the other end of resistor 406 connects to a first end of a resistor 408 and to a base terminal of a PNP transistor 410. The other end of resistor 408 and an emitter of transistor 410 connect to positive power 214. A collector terminal of transistor 410 connects to a first end of a resistor 418; the other end of resistor 418 connects to control signal 112. A first end of a resistor 420 also connects to control signal 112 (and thus to the second end of resistor 418). The other end of resistor 420 connects to a collector terminal of an NPN transistor 416. An emitter terminal of transistor 416 connects to negative power 212 of power circuit 202. A base terminal of transistor 416 connects to a first end of a resistor 414; the second end of resistor 414 connects to internal signal 205. In one example, transistors 402 and 416 are of type BC846A, transistor 410 is of type BC856A, resistors 404, 406, 408 and 414 each have a value of 10K ohms, and resistors 418 and 420 each have a value of 100 ohms. As apparent to one skilled in the art, drive circuit 206 may be implemented in other ways, such as with CMOS.

Transistors 410 and 416 operate to drive control signal 112 between the voltages of positive power 214 and negative power 212 of power circuit 202 based upon internal signal 205. Transistor 402 operates to prevent both transistors 410 and 416 turning on at the same time. Signal generator 204, FIG. 2, generates internal signal 205 with reference to negative power 212 and logic power 216. Since the base terminal of transistor 402 is held at logic power 216, transistor 402 turns on (i.e., conducts) only when internal signal 205 is low (i.e., is at or about negative power 212). When internal signal 205 is low, transistor 402 is turned on, initiating current flow through resistors 404, 406 and 408 and causing a voltage drop across resistor 408 such that the base terminal of transistor 410 is at a lower voltage than the emitter terminal of transistor 410. At the same time, the low of internal signal 205 causes the base terminal of transistor 416 to be substantially at the same voltage as the emitter terminal of transistor 416, thereby turning transistor 416 off. With transistor 410 turned on and transistor 416 turned off, control signal 112 is pulled to be substantially equal to positive power 214.

When internal signal 205 is high (i.e., is at or about logic power 216), the emitter terminal of transistor 402 is at substantially the same potential as the base terminal (logic power 216), such that transistor 402 is turned off and no substantial current flows through resistors 404, 406 and 408. With no current through resistor 408, the base terminal of transistor 410 is biased by resistor 408 to positive power 214, and transistor 410 is turned off. At the same time, the voltage applied to the base terminal of transistor 416 (via resistor 414) is greater than the voltage of the emitter terminal of transistor 416, such that transistor 416 turns on. With transistor 416 turned on and transistor 410 turned off, control signal 112 is pulled to be substantially equal to negative power 212.

Thus, the voltage of control signal 112 toggles between positive power 214 and negative power 212 based upon internal signal 205. More particularly, a positive voltage and a negative voltage of control signal 112 are generated to fall either side of a voltage midpoint that is substantially midway between potentials of power lines 104 and 106. That is, since positive power 214 and negative power 212 are stabilized (by DC stabilization circuit 203) to AC power source 102 (and power lines 104 and 106), positive power 214 has a voltage higher than the voltage midpoint and negative power 212 has a voltage less than the voltage midpoint.

Figure 5A:
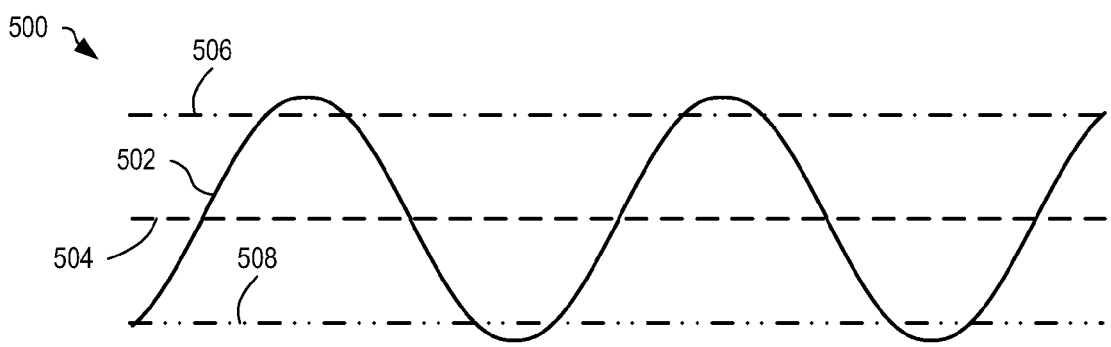
FIG. 5A shows an exemplary waveform output by the AC source of FIG. 1.

FIG. 5A shows an exemplary graph of a waveform 502 of AC power source 102, FIG. 1, and illustrating: (i) a voltage midpoint 504, representative of the potential of reference point 353 of DC stabilization circuit 203, FIG. 3, centered between peaks of waveform 502; (ii) an exemplary positive voltage level 506, representative of the potential of positive power 214; and (iii) an exemplary negative voltage level 508, representative of the potential of negative power 212.

Figure 5B:
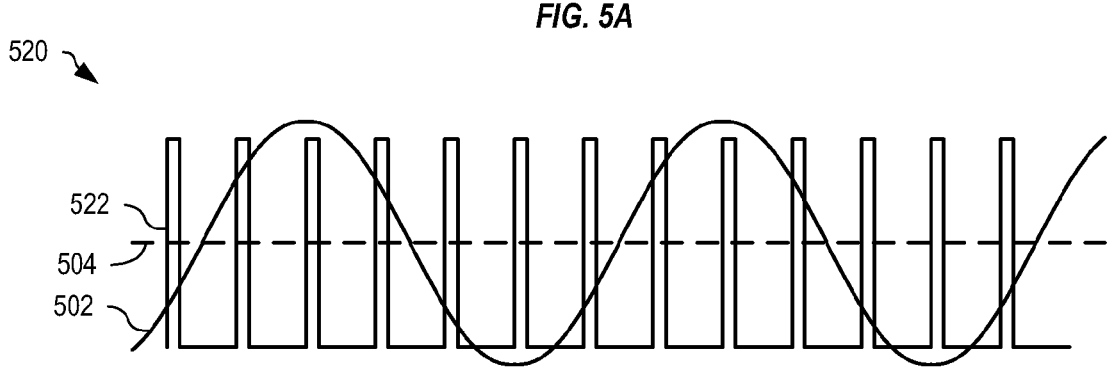
FIGS. 5B, 5C and 5D show exemplary waveforms of the control signal of FIG. 1 relative to the AC source waveform of FIG. 5A.
Figure 5C:
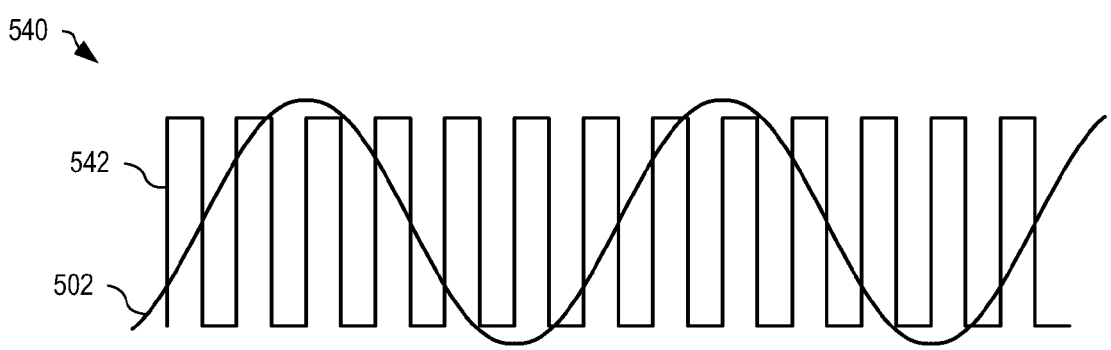
Figure 5D:
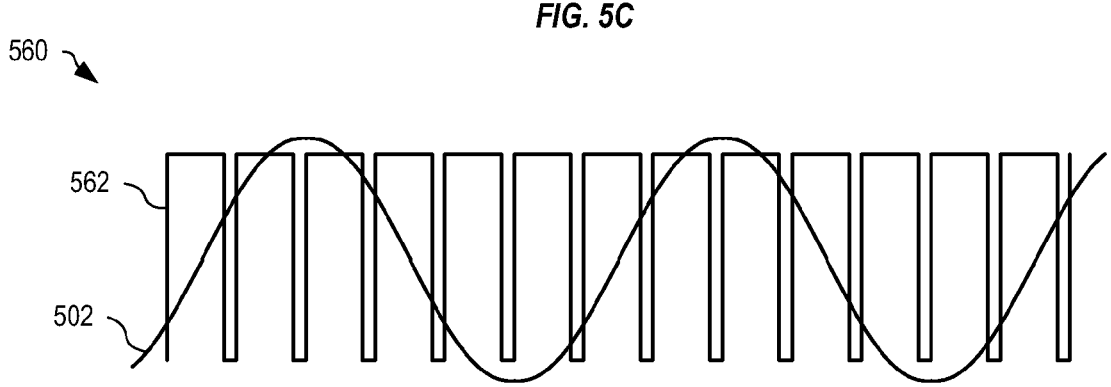

FIGS. 5B, 5C and 5D show exemplary waveforms 522, 542 and 562 of control signal 112 of FIG. 1 relative to waveform 502 of AC power source 102, FIG. 1, illustrating the use of a PWM signal to represent information of an 80% on level, a 50% on level and an 20% on level, respectively.

Unlike prior art unreferenced signals, since control signal 112 is referenced to AC power source 102, control signal 112 may also operate at 100% and 0% PWM; that is, control signal 112 may be decoded even when non-toggling and at a DC level of positive power 214 and negative power 212. For example, when control signal 112 is non-toggling and at substantially the potential of positive power 214, a 0% level (i.e., turn fully off) is conveyed, and when control signal 112 is non-toggling and at substantially the potential of negative power 212, a 100% level (i.e., turn fully on) is conveyed.

Control signal 112 may convey any digital signal from controller 108 to slave units 110. For example, signal generator 204 may represent a microcontroller that outputs serial data as internal signal 205, and output 605 of compare circuit 602 may be input to a second microcontroller, within slave unit 110, that decodes the serial data for use within the slave unit. For example, such an protocol may allow each slave unit to be independently control through the use of individual addresses encoded within the serial data.

Slave unit 110 may be used to control many different types of device and system. However, in the following, slave unit 110 is exemplified as a lighting control circuit with light-emitting-diode (LED) based lighting modules. It is noted that system 100 is particular suited to control lighting modules using PWM (as shown in FIGS. 5B-5D) over control signal 112 since this PWM signal may be easily decoded and used as an input to commercially available LED driver devices, as described below. Other embodiments of slave unit 110 configured to receive control signal 112 and implement appropriate control of one or more devices will be apparent to one skilled in the art, and are included in the scope of the present disclosure.

Figure 6:
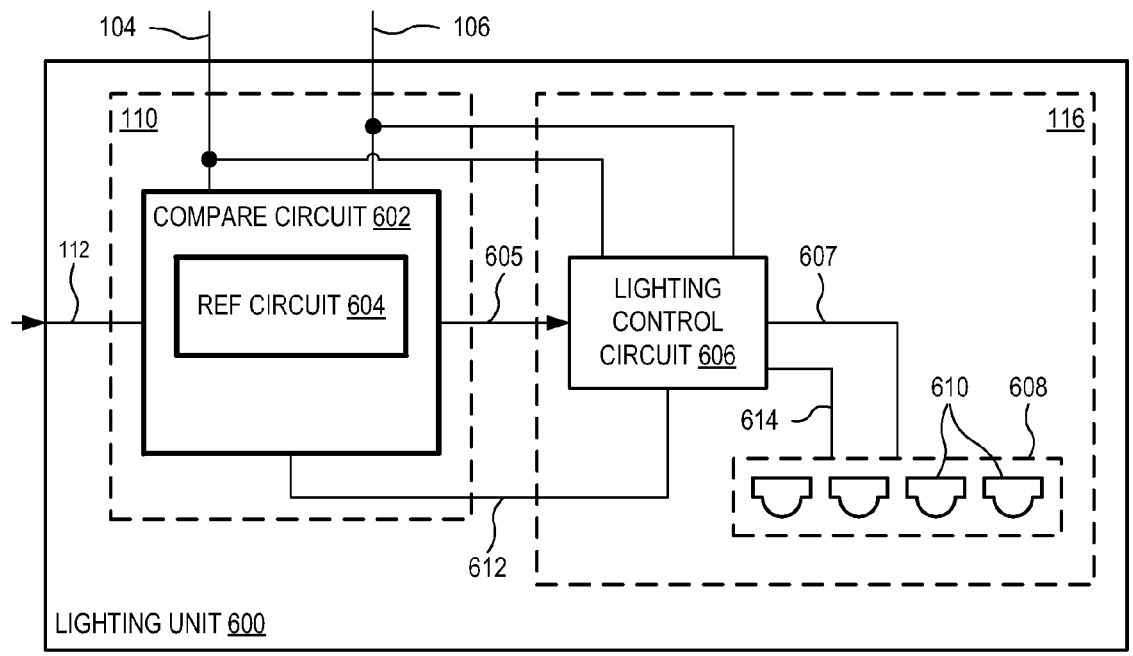
FIG. 6 is a block diagram illustrating the lighting unit of FIG. 1 in further detail.

FIG. 6 is a block diagram illustrating a lighting unit 600 representing slave unit 110 and application circuit 116 of FIG. 1. Lighting unit 600 includes a compare circuit 602, a lighting control circuit 606 and a light emitting module 608 that may contain one or more LEDs 610. Compare circuit 602 includes a reference circuit 604 that generates a reference signal from power lines 104, 106 for comparison with control signal 112 (received from controller 108, FIGS. 1 and 2). Compare circuit 602 generates an output signal 605 for input to lighting control circuit 606 that controls light output from light emitting module 608. A common ground 612 connects compare circuit 602 and lighting control circuit 606 to provide a reference between circuits 602 and 606. An LED power output 607 and a LED power return line 614 connect from lighting control circuit 606 to light emitting module 608.

Figure 7:
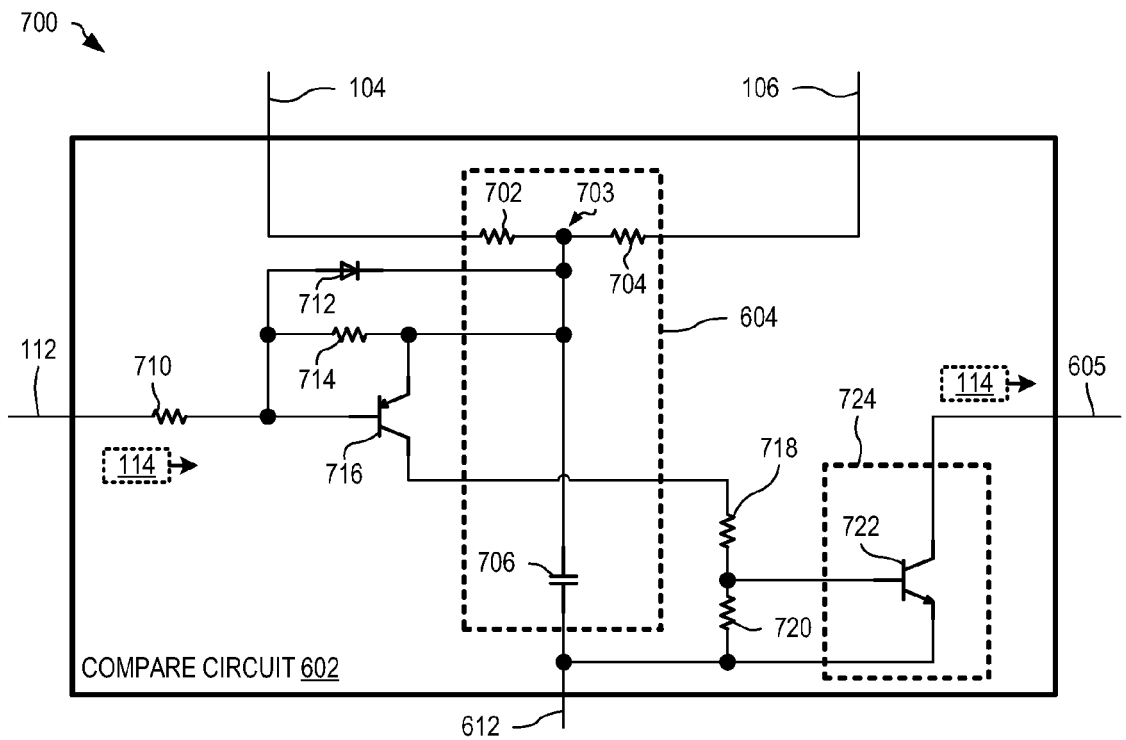
FIG. 7 shows one exemplary circuit diagram for implementing the compare circuit of FIG. 6.

FIG. 7 shows one exemplary circuit diagram 700 for implementing compare circuit 602, FIG. 6. Compare circuit 602 receives power lines 104 and 106 into reference circuit 604. Within reference circuit 604, a first end of a resistor 702 connects to power line 104; the other end of resistor 702 connects, at a reference point 703, to a first end of a resistor 704. The other end of resistor 704 connects to power line 106. Resistors 702 and 704 are of equal value and form a potential divider between power lines 104 and 106 such that a comparison voltage of reference point 703 is substantially midway between voltages of power lines 104 and 106.

Control signal 112, conveying information 114, connects to a first end of a resistor 710; the other end of resistor 710 connects to a base terminal of a PNP transistor 716. An emitter terminal of transistor 716 connects to reference point 703. A first end of a resistor 714 connects to the base terminal of transistor 716 (and thus to the other end of resistor 710); the other end of resistor 714 connects to reference point 703. A cathode of a diode 712 also connects to reference point 703, and the anode of diode 712 connects to the base terminal of transistor 716. Diode 712 protects transistor 716 against excessive reverse bias from control signal 112 when high (i.e., substantially equal to the potential of positive power 214, FIG. 2). A collector of transistor 716 connects to a first end of a resistor 718; the second end of resistor 718 connects to a base terminal of a transistor 722. A first end of a resistor 720 connects to the base terminal of transistor 722 and thus to the second end of resistor 718; the second end of resistor 720 connects to an emitter of transistor 722 and to common negative power 612 (i.e., the emitter of transistor 722 also connects to common negative power 612). A collector of transistor 722 provides output signal 605 by operating as a current sink switch 724. That is, transistor 722 sinks current from output signal 605 when turned on, but does not provide an active output voltage. A capacitor 706 connects between reference point 703 and common negative power 612 to provide stability to common negative power 612. Reference circuit 604 is similar to DC stabilization circuit 203, FIG. 2, each operating to provide a reference to power source 102 through power lines 104 and 106.

In one example, resistor 710 has a value of 470K ohms, resistors 702, 704 and 720 each have a value of 10K ohms, resistors 714 and 718 each have a value of 100K ohms, capacitor 706 has a value of 1 µF, transistor 716 is a BC856A and transistor 722 is a BC846A.

In one example of operation, when control signal 112 is high (i.e., substantially the voltage of positive power 214, FIG. 4), current flows through resistor 710 and diode 712 to reference point 703, thereby causing a voltage drop across resistor 710 to avoid excessive reverse voltage across the base terminal and the emitter terminal of transistor 716, which is off. When control signal 112 is low (i.e., substantially the voltage of negative power 212), base terminal of transistor 716 is pulled lower than the emitter terminal of transistor 716 by current flowing through resistors 714 and 710, thereby turning transistor 716 on, resulting in current flowing through resistors 718 and 720 such that the base terminal of transistor 722 rises above the emitter terminal voltage of transistor 722, turning transistor 722 (i.e., current sink switch 724) on. Information 114, conveyed by control signal 112, is thus transferred through compare circuit 602 to output signal 605. The use of current sink switch 724 allows use of output signal 605 in a wide variety of circuits, since output signal 605 is not limited to a specific voltage with reference to common negative power 212.

Although implemented as a PWM signal in the example of FIGS. 6 and 7, output signal 605 of compare circuit 602 may be implemented in other formats, depending upon requirements of application circuit 116, without departing from the scope hereof. For example, compare circuit 602 may contain additional components (e.g., a filter) to convert a PWM signal of control signal 112 into a voltage level based signal for use in a specific application.

Figure 8:
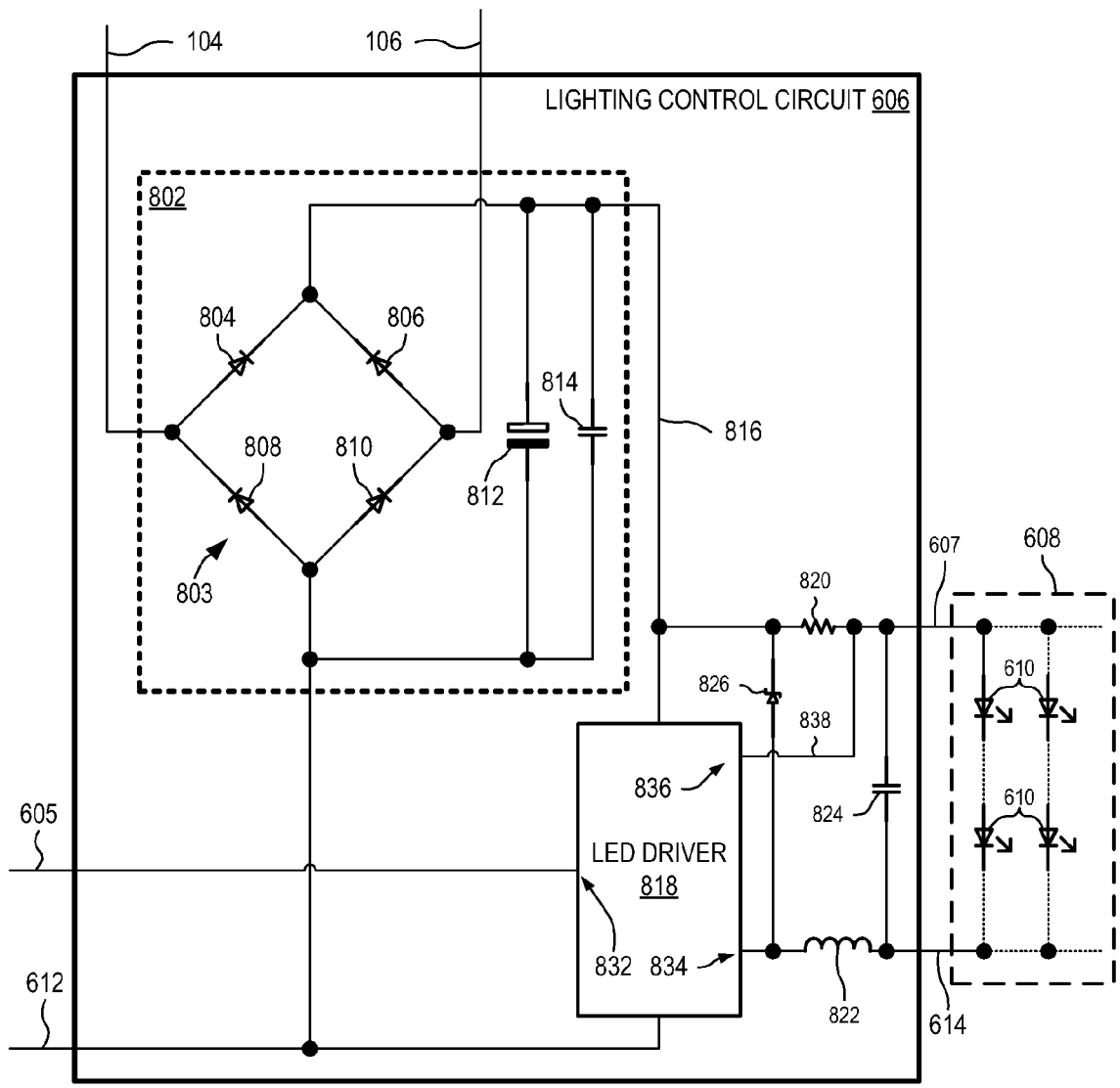
FIG. 8 is a schematic diagram showing the lighting control circuit of FIG. 6 in further detail.

FIG. 8 is a schematic diagram showing lighting control circuit 606 of FIG. 6 in further detail. Lighting control circuit 606 is shown with a power supply circuit 802 and an LED driver 818. LED driver 818 may represent a ZXLD1362 driver chip from Zetex Semiconductors plc, that is a continuous mode inductive step down converter designed for driving single or multiple series connected LEDs efficiently from a voltage source higher than LED voltage, and includes an adjust input 832 that accepts a PWM waveform (e.g., as supplied by output signal 605 when signal generator 204, FIG. 2, is configured to generate internal signal 205 as a PWM signal) to control the output current. Power supply circuit 802 includes four diodes 804, 806, 808 and 810 formed as a bridge rectifier 803, and two capacitors 812 and 814. More or fewer capacitors may be included within power supply circuit 802 without departing from the scope hereof. Power supply circuit 802 receives power from power lines 104 and 106 to produce positive power on line 816 with respect to common negative power 612. In one example, diodes 804, 806, 808 and 810 are each of type RS1B, electrolytic capacitor 812 has a value of 100 µF and capacitor 814 has a value of 1 µF.

LED driver 818 connects to positive power line 816 and common negative power 612. A first end of a resistor 820 connects to positive power line 816; and the other end of resistor 820 forms LED power output line 607. LED power return line 614 connects to a first end of an inductor 822; the other end of inductor 822 connects to a current drain 834 of LED driver 818. An optional feedback line 838 connects from LED power output line 607 to a sense input 836 of LED driver 818 for control of current drain 834. An optional capacitor 824 connects between LED power output line 607 and common negative power 612. A cathode of a Schottky diode 826 connects to positive power output line 816 and the anode of Schottky diode 826 connects to current drain 834. In one example, capacitor 824 has a value of 1 µF, resistor 820 has a value of 1 ohm for a current of 100 mA, Schottky diode 826 is of the type ZLLS1000, inductor 822 has a value of 100 µH and LEDs 610 are each 1W LEDs identified as NS6L083 from Nichea. LED 610 may represent any type of light emitting diode device and other devices based thereon, such as superluminous diodes and laser diodes.

Light emitting module 608 is shown with an array of four LEDs 610, configured as two LEDs in series in parallel with two other LEDs in series, in this example, however, light emitting module 608 may include more or fewer LEDs configured in serial and/or parallel without departing from the scope hereof.

Output signal 605 is input to adjust input 832 of LED driver 818 which includes an internal pull-up resistor to allow control of adjust input 832 by current sink switch 724, FIG. 7. In this example, LED driver 818 controls current through resistor 820, LEDs 610 and inductor 822 based upon adjust input 832 and feedback 616. Resistor 820 may be implemented as two or more parallel connected resistors depending upon the connectivity and number of LEDs 610 within light emitting module 608.

Figure 9:
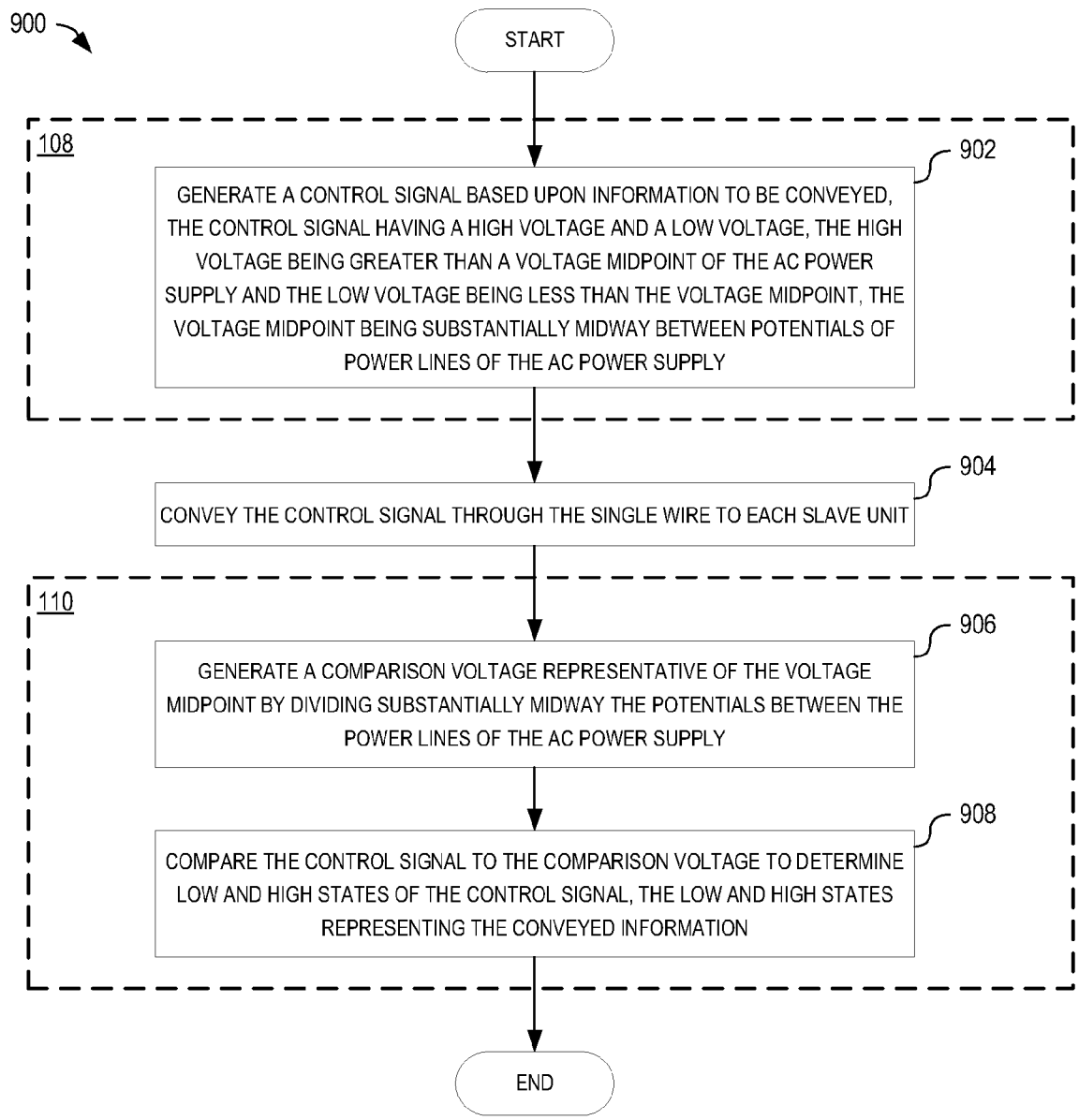
FIG. 9 is a flowchart illustrating one exemplary method for conveying level information using a single wire control signal referenced to an alternating current (AC) power supply.

FIG. 9 is a flowchart illustrating one exemplary method 900 for conveying information 114 from controller 108 (FIG. 1) to at least one slave unit 110 through a single wire (e.g., the single wire of control signal 112) referenced to AC power source 102.

Steps 902 may be implemented within controller 108. In step 902, method 900 generates a control signal based upon information to be conveyed, the control signal having a high voltage and a low voltage, the high voltage being greater than a voltage midpoint of the AC power supply and the low voltage being less than the voltage midpoint, the voltage midpoint being substantially midway between potentials of power lines of the AC power supply. In one example of step 902, drive circuit 206 generates control signal 112 using positive power 214 and negative power 212 of power circuit 202.

In step 904, method 900 conveys the control signal through the single wire to each slave unit. Step 904 is implemented by the single wire of control signal 112 that connects from controller 108 to each slave unit 110.

Steps 906 and 908 may be implemented within each slave unit 110. In step 906, method 900 generates a comparison voltage representative of the voltage midpoint by dividing substantially midway the potentials between the power lines of the AC power supply. In one example of step 906, resistors 702 and 704 of reference circuit 604, FIG. 7, have substantially equal resistance values such that a potential between power lines 104 and 106 is divided in half to form a comparison voltage at reference point 703. In step 908, method 900 compares the control signal to the comparison voltage to determine low and high states of the control signal, the low and high states representing the conveyed information. In one example of step 908, transistor 716 of compare circuit 602 compares control signal 112 to the comparison voltage of reference point 703 (generated in step 906) to determine high and low states of control signal 112 conveyed over the single wire from controller 108.

Changes may be made in the above methods and systems without departing from the scope hereof. It should thus be noted that the matter contained in the above description or shown in the accompanying drawings should be interpreted as illustrative and not in a limiting sense. For example, although the examples contained herein describe the conveyance of a PWM signal by control signal 112, other digital signals (such as serial output from signal generator 204) may be conveyed by control signal 112 with the use of appropriate encoding and decoding circuits, without departing from the scope hereof. Also, it should be clear that upon reading and appreciating this disclosure in full, at least the following embodiments are contemplated:

A method for transmitting information from a controller to a slave unit over a single wire referenced to an alternating current (AC) power supply common to both the controller and the slave unit. The method includes determining the information based upon at least one input to the controller, and transmitting, from the controller over the single wire, a control signal based upon the information. The control signal has (a) a high voltage that is greater than a voltage midpoint, (midway between potentials of power lines of the AC power supply), and (b) a low voltage that is less than the voltage midpoint.

This method may optionally include generating, within the controller, direct current (DC) power from the AC power supply, and stabilizing the DC power relative to the voltage midpoint of the AC power supply, such that the high voltage is higher than the voltage midpoint and that the low voltage is lower than the voltage midpoint.

This method may also optionally include generating a stabilization voltage substantially equal to the voltage midpoint, by dividing the potentials of the power lines of the AC power supply, the stabilization voltage being used to stabilize the DC power.

In this method, the step of stabilizing may optionally include configuring a DC power supply generating the DC power to have a power factor of approximately 1 such that diodes of a bridge rectifier of the DC power supply are conducting power for substantially all of a cycle period of the AC power supply.

A method for receiving, at a slave unit, information from a controller over a single wire referenced to an alternating current (AC) power supply common to both the controller and the slave unit. The method includes generating a comparison voltage substantially midway between potentials of power lines of the AC power supply, and comparing a control signal, received via the single wire, to the comparison voltage to determine low and high states of the control signal to regenerate the information.

This method may optionally include activating and deactivating a current sink switch based upon the low and high states, the current sink switch driving an input to an application circuit. This may in turn, for example, include controlling an input of a lighting control circuit with the current sink switch, the lighting control circuit controlling light output from a lighting module based upon the control signal.

This method may also optionally include the information comprising a level having a range 0% to 100%, the control signal comprising a pulse-width-modulated (PWM) signal having a mark-to-space ratio based upon the level. The PWM signal may not toggle when the level is 0% or 100%.

A controller for transmitting information to a slave unit over a single wire referenced to an alternating current (AC) power supply common to both the controller and the slave unit. The controller includes at least one input for receiving the information, and a drive circuit for driving the single wire with a control signal based upon the information. The control signal has a high voltage and a low voltage, the high voltage being greater than a voltage midpoint of the AC power supply that is substantially midway between potentials of power lines of the AC power supply, and the low voltage is less than the voltage midpoint.

This controller may further include a signal generator for converting the information into a format suitable for input to the drive circuit. In turn, the signal generator may include a microcontroller. The format may be a digital signal, a pulse width modulated signal or a binary signal.

This controller may further include a direct current (DC) power supply for generating the high voltage and the low voltage.

In this controller, the DC power supply may include a stabilization circuit for stabilizing the high voltage and the low voltage with respect to the voltage midpoint. When this is the case, the stabilization circuit may generate a stabilization voltage by dividing substantially midway the potentials of the power lines of the AC power supply, the stabilization circuit maintaining an offset voltage between the low voltage and the stabilization voltage.

In this controller, the stabilization circuit may include a resistor for increasing a power factor of the DC power supply to stabilize the high voltage and the low voltage with respect to the voltage midpoint.

A slave unit for receiving information from a controller over a single wire referenced to an alternating current (AC) power supply common to both the controller and the slave unit. The slave unit may include a reference circuit for generating a comparison voltage by dividing substantially midway potentials of power lines of the AC power supply, and a compare circuit for comparing a control signal received via the single wire to the comparison voltage to determine low and high states of the control signal that represent the information.

This slave unit of may further include a current sink switch for driving an application circuit based upon the low and high states.

This slave unit of may further include circuitry for generating an output signal based upon a desired input to an application circuit. Such output signal may include an analog signal.

A method for controlling light emitted by one or more lighting units from a controller, the one or more lighting units connecting to the controller by a single wire referenced to an alternating current (AC) power supply common to the controller and the one or more lighting units. The method includes generating, within the controller, a pulse-width-modulated (PWM) control signal based upon a desired light output level. The PWM control signal has a low voltage and a high voltage, the low voltage being less than a voltage midpoint substantially midway between potentials of power lines of the AC power supply, and the high voltage being greater than the voltage midpoint. The method includes conveying the PWM control signal through the single wire to each of the one or more lighting units and generating, at each of the one or more lighting units, a comparison voltage by dividing substantially midway the potentials of the power lines of the AC power supply. The method also includes comparing, at each of the one or more lighting units, the PWM control signal to the comparison voltage to determine low and high states of the control signal, the low and high states representing the desired light output level; and controlling the light emitted by the one or more lighting units based upon the low and high states.

This method may further include generating, within the controller, a stabilization voltage by dividing substantially midway the potentials of the power lines of the AC power supply, and stabilizing the low voltage and the high voltage with an offset voltage between the stabilization voltage and at least one of the low voltage and the high voltage.

In this method, the desired light output level may have a range of 0% to 100%, and the step of generating, within the controller, may include holding the PWM control signal at one or the low voltage and the high voltage the desired light output level is either 0% or 100%.

The following claims are intended to cover all generic and specific features described herein, as well as all statements of the scope of the present method and system, which, as a matter of language, might be said to fall there between.

What is claimed is:

1. A method for conveying information from a controller to a slave unit using a single wire referenced to alternating current (AC) power, the method comprising:
   transmitting, from the controller, a control signal through the single wire to the slave unit, the control signal comprising a high voltage greater than a voltage midpoint that is substantially midway between potentials of the AC power and a low voltage that is less than the voltage midpoint, and wherein the high and low voltages convey the information;
   generating, using a potential divider circuit at the slave unit, a comparison voltage that is substantially midway between potentials of the AC power; and
   comparing, at the slave unit, the control signal to the comparison voltage to determine low and high states of the control signal.

2. The method of claim 1, further comprising:
   generating, within the controller, direct current (DC) power from the AC power; and
   stabilizing the DC power relative to the voltage midpoint, such that the high voltage is greater than the voltage midpoint and the low voltage is less than the voltage midpoint.

3. The method of claim 2,
   the step of generating the control signal comprising generating the high and low voltages as substantially equal to a positive voltage and a negative voltage, respectively, of the DC power; and
   further comprising generating, within the controller, a stabilization voltage by dividing substantially midway the potentials between power lines of the AC power, the step of stabilizing the DC power utilizing the stabilization voltage.

4. The method of claim 3, the step of stabilizing comprising maintaining an offset voltage between the low voltage and the stabilization voltage.

5. The method of claim 1, the step of generating the control signal comprising generating the control signal as a pulse-width-modulated (PWM) signal having a mark-to-space ratio that is based upon a 0% to 100% level of the information.

6. The method of claim 5, the step of generating the control signal comprising maintaining the PWM signal at the low voltage when the level is 0% and maintaining the PWM signal at the high voltage when the level is 100%.

7. The method of claim 1, further comprising controlling light output from a lighting module with the low and high states by respectively activating and deactivating a current sink switch to control the lighting module.

8. A system for conveying information through a single wire referenced to alternating current (AC) power, the system comprising:
   a drive circuit for driving the single wire with a control signal based upon the information and having a low voltage less than a voltage midpoint of the AC power and a high voltage greater than the voltage midpoint, wherein the voltage midpoint is substantially midway between potentials of the AC power;
   a reference circuit for generating a comparison voltage by dividing substantially midway the potentials of the AC power; and
   a compare circuit for comparing the control signal received via the single wire to the comparison voltage to determine low and high states of the control signal, wherein the low and high states represent the information.

9. The system of claim 8, further comprising
   a direct current (DC) power supply that provides the low voltage and the high voltage to the drive circuit;
   the DC power supply comprising a stabilization circuit that generates a stabilization voltage by dividing substantially midway the potentials of power lines of the AC power, and uses the stabilization voltage to provide an offset voltage to stabilize the high voltage and the low voltage with respect to the voltage midpoint.

10. The system of claim 8, further comprising an output signal generated from the low and high states to control an application circuit.

11. The system of claim 10, further comprising a current sink switch that drives the output signal.

12. The system of claim 10, the output signal being a pulse width modulation signal.

13. A method for receiving information from a controller using a single wire referenced to alternating current (AC) power, wherein the controller transmits, through the single wire, a control signal comprising a high voltage greater than a voltage midpoint that is substantially midway between potentials of the AC power and a low voltage that is less than the voltage midpoint, and wherein the high and low voltages convey the information, the method comprising:
   generating a comparison voltage that is substantially midway between potentials of the AC power; and
   comparing the control signal to the comparison voltage to determine low and high states of the control signal.

14. The method of claim 13, further comprising controlling an application circuit with the low and high states.

15. The method of claim 14, wherein the application circuit is a lighting control circuit that controls light output from a lighting module based upon the information, the step of controlling the application circuit comprising activating and deactivating a current sink switch to control the application circuit.

16. A slave unit for receiving information through a single wire referenced to alternating current (AC) power, wherein a controller transmits, through the single wire, a control signal comprising a high state represented by a voltage greater than a voltage midpoint that is substantially midway between potentials of the AC power and a low state represented by a voltage that is less than the voltage midpoint, and wherein the high and low states represent the information, the slave unit comprising:
   a circuit that compares the control signal received via the single wire to a comparison voltage, to determine low and high states of the control signal.

17. The slave unit of claim 16, the circuit comprising a reference circuit that generates the comparison voltage by utilizing a voltage divider across the AC power.

18. A method for transmitting information from a controller to a slave unit using a single wire referenced to alternating current (AC) power, the method comprising:
   transmitting a control signal through the single wire from the controller to the slave unit, wherein the control signal comprises a high voltage greater than a voltage midpoint that is substantially midway between potentials of the AC power and a low voltage that is less than the voltage midpoint, and wherein the high and low voltages represent high and low states, respectively, of the information.

19. The method of claim 18, further comprising controlling light output from a lighting module with the slave unit, by utilizing the low and high states to respectively activate and deactivate a current sink switch to control the lighting module.

20. A controller for transmitting information through a single wire referenced to alternating current (AC) power, the controller comprising:
   a drive circuit for driving the single wire with a control signal based upon the information, the control signal having a low voltage less than a voltage midpoint that is substantially midway between potentials of the AC power and a high voltage greater than the voltage midpoint, wherein the high and low voltages represent high and low states, respectively, of the information.

21. The controller of claim 20, further comprising
   a direct current (DC) power supply that provides the low voltage and the high voltage to the drive circuit;
   the DC power supply comprising a stabilization circuit that generates a stabilization voltage by dividing substantially midway the potentials of power lines of the AC power, and uses the stabilization voltage to provide an offset voltage to stabilize the high voltage and the low voltage with respect to the voltage midpoint.

22. The controller of claim 20, further comprising an output signal generated from the low and high states to control an application circuit.

23. The controller of claim 22, further comprising a current sink switch that drives the output signal.

24. The controller of claim 22, the output signal being a pulse width modulation signal.

* * * * *